No. 883,668. PATENTED MAR. 31, 1908.
C. W. RADOLL.
CLOTHES LINE HOLDER.
APPLICATION FILED FEB. 6, 1907.

Inventor
Charles W. Radoll,

Witnesses

By Victor J. Evans,
Attorney

UNITED STATES PATENT OFFICE.

CHARLES W. RADOLL, OF CHICAGO, ILLINOIS.

CLOTHES-LINE HOLDER.

No. 883,668.          Specification of Letters Patent.          Patented March 31, 1908.

Application filed February 6, 1907. Serial No. 356,112.

*To all whom it may concern:*

Be it known that I, CHARLES W. RADOLL, a citizen of the United States, residing at Chicago, in the county of Cook and State of Illinois, have invented new and useful Improvements in Clothes-Line Holders, of which the following is a specification.

This invention relates to line holders designed especially for use in holding clothes lines and has for its objects to provide a comparatively simple, inexpensive device of this character with which the line may be readily engaged, one which will firmly and securely grip the line, and one which permits of slack in the line being conveniently taken up.

With these and other objects in view, the invention comprises the novel features of construction and combination of parts all fully hereinafter described.

Figure 1:
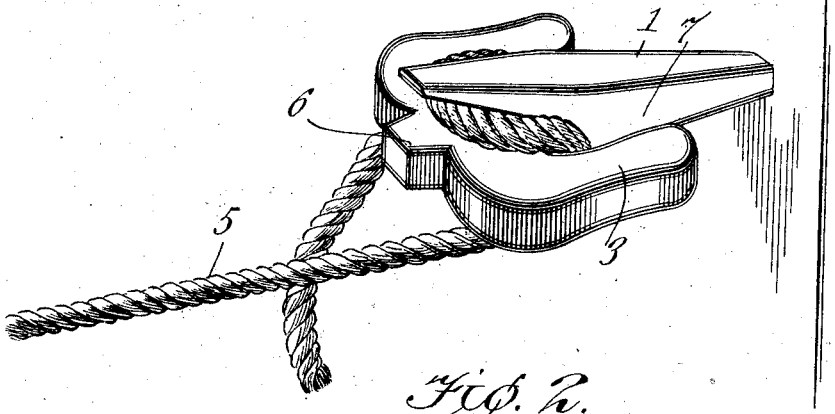
Figure 2:
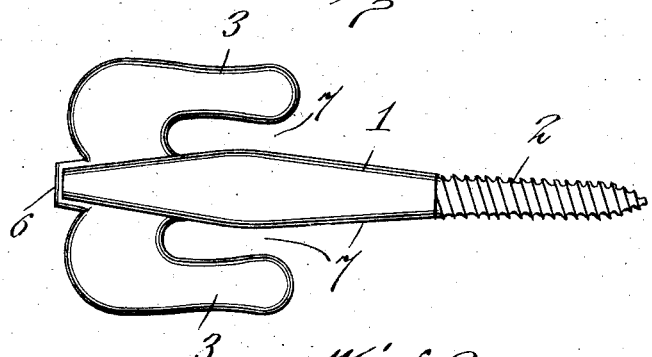
Figure 3:
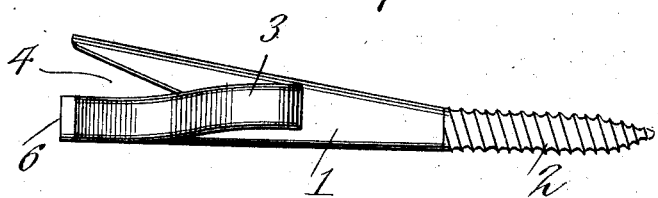

In the accompanying drawings, Figure 1 is a perspective view of a line holder embodying the invention and showing the same in use. Fig. 2 is a top plan view of the holder. Fig. 3 is a side elevation of the same.

Referring to the drawings, it will be seen that the holder, which is of substantially anchor shape, comprises a body portion or shank 1 that is in the form of an elongated diamond or swells from each end to the middle and has at its rear end a screw-threaded portion 2 adapted for entrance into a post or other support, there being formed at the outer end of the shank and respectively at opposite sides thereof, a pair of rearwardly projecting engaging hooks or flukes 3 which are pitched at a slight upward inclination, as seen more clearly in Fig. 3. The shank 1 increases in vertical dimensions from the rear end to the front and is provided at its outer or forward end, at a point above the meeting ends of the hooks 3, with a longitudinal V-shaped slot or recess 4, in which the rope or line 5 is seated, while formed midway between and at the point of juncture of the hooks 3 is a forwardly projecting piece or lug 6 designed to receive the impact of a hammer or other tool in the operation of starting the screw 2 into the support with which the device is engaged. The shank 1 is enlarged transversely at a point somewhat in advance of the rear ends of the hooks 3, thus to provide said hooks with restricted entrance openings or mouths 7.

In practice, the holding device is attached to a post or other support by entering the screw-threaded portion 2 of the shank thereinto and the line 5 is engaged with the holder as seen in Fig. 1, by passing the line into one of the hooks 3, thence into the V-shaped slot 4 and finally into the other hook, it being noted that under this arrangement, tension on the line will tend to draw the portion thereof which is entered in the slot 4 rearward in said slot, thereby causing a secure gripping or binding action of the rope within the slot. Furthermore, it is to be noted that owing to the hooks 3 having restricted entrance mouths 7, liability of the line, in the event of its becoming slack, escaping from said hooks is obviated.

Having thus described the invention, what I claim is:—

1. A device of the class described comprising a shank which increases in width inwardly from both ends and is provided with a threaded extremity at its rear end, side arms extending laterally and rearwardly with respect to the shank and arranged with their extremities adjacent the point of greatest width of the shank to form side mouths each contracted at the entrance and widening inwardly, the front end of the shank being provided with a rearwardly extending V-shaped slot disposed above the plane of the arms, and a lug extending forwardly from between the arms to form a striking head to drive the said threaded portion into a support.

2. A device of the class described comprising a shank having a horizontal bottom surface and an inclined top surface and of greatest width at a point intermediate its ends, a screw on one end of the shank, a driving lug on the opposite end of the shank, rearwardly extending arms disposed at the sides of the shank and inclined upwardly and disposed with their extremities adjacent the widest point of the shank to form side mouths contracted at their entrance, the front end of the shank being provided with a V-shaped slot, the bottom of which is flush with the top sides of the arms at their inner ends.

In testimony whereof, I affix my signature in presence of two witnesses.

CHARLES W. RADOLL.

Witnesses:
BENJAMIN A. WEICH,
CHARLES ZABEL.